(12) United States Patent
Spranger et al.

(10) Patent No.: US 9,830,352 B2
(45) Date of Patent: Nov. 28, 2017

(54) INFORMATION PROCESSING DEVICE, INFORMATION PROCESSING SYSTEM, INFORMATION PROCESSING METHOD, AND PROGRAM

(71) Applicant: Sony Corporation, Tokyo (JP)

(72) Inventors: Michael Spranger, Tokyo (JP); Kazumi Aoyama, Saitama (JP); Mario Tokoro, Tokyo (JP); Tetsu Natsume, Chiba (JP); Katsuki Minamino, Tokyo (JP)

(73) Assignee: Sony Corporation, Tokyo (JP)

( * ) Notice: Subject to any disclaimer, the term of this patent is extended or adjusted under 35 U.S.C. 154(b) by 372 days.

(21) Appl. No.: 14/587,078

(22) Filed: Dec. 31, 2014

(65) Prior Publication Data

US 2015/0227580 A1     Aug. 13, 2015

(30) Foreign Application Priority Data

Feb. 13, 2014  (JP) ................................ 2014-025683

(51) Int. Cl.
*G06F 17/30* (2006.01)
(52) U.S. Cl.
CPC .............................. *G06F 17/30401* (2013.01)
(58) Field of Classification Search
None
See application file for complete search history.

(56) References Cited

U.S. PATENT DOCUMENTS

| | | | | |
|---|---|---|---|---|
| 7,894,424 B2* | 2/2011 | Sako | ................ | G06F 17/30044 370/368 |
| 7,979,432 B2* | 7/2011 | Momosaki | ........ | G06F 17/30787 707/736 |
| 8,027,965 B2* | 9/2011 | Takehara | .......... | G06F 17/30864 455/2.01 |
| 8,095,652 B2* | 1/2012 | Rudy | ................ | G06F 17/30867 709/218 |
| 8,135,700 B2* | 3/2012 | Takehara | .......... | G06F 17/30864 707/712 |
| 8,533,294 B2* | 9/2013 | Sun | ................... | H04M 1/72522 709/219 |
| 2007/0094274 A1* | 4/2007 | Jung | ................ | G06F 17/30749 |
| 2008/0082523 A1* | 4/2008 | Momosaki | ........ | G06F 17/30787 |
| 2015/0207701 A1* | 7/2015 | Faaborg | ................ | H04L 67/18 709/224 |

FOREIGN PATENT DOCUMENTS

| | | |
|---|---|---|
| JP | 2002-117061 | 4/2002 |
| JP | 2011-146026 | 7/2011 |

* cited by examiner

*Primary Examiner* — Debbie Le
(74) *Attorney, Agent, or Firm* — Paratus Law Group, PLLC

(57) ABSTRACT

There is provided an information processing device including a storage unit configured to store identification data and attribute data of each of a plurality of pieces of content, the attribute data being associated with the identification data, and a retrieval unit configured to specify attribute data corresponding to a retrieval key and perform retrieval of identification data related to another attribute data associated with identification data related to the specified attribute data.

17 Claims, 11 Drawing Sheets

FIG.1
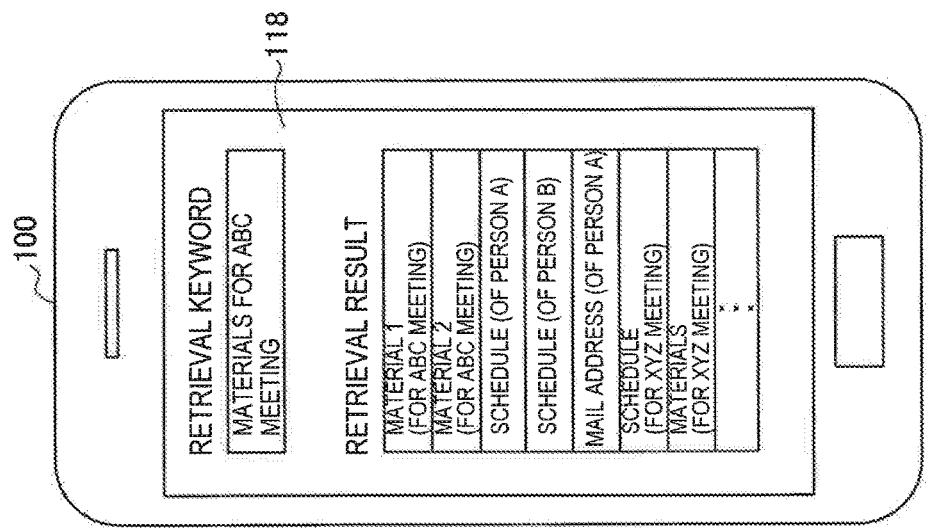
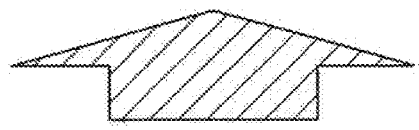
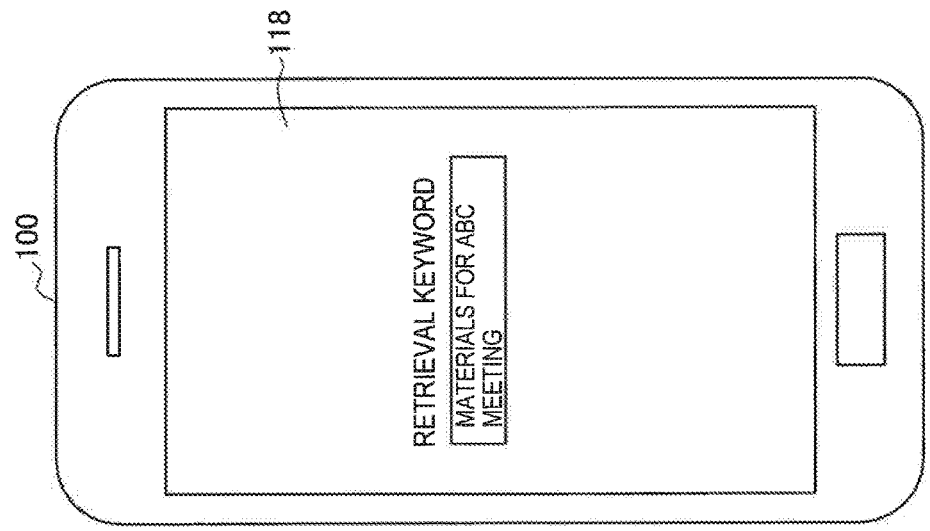

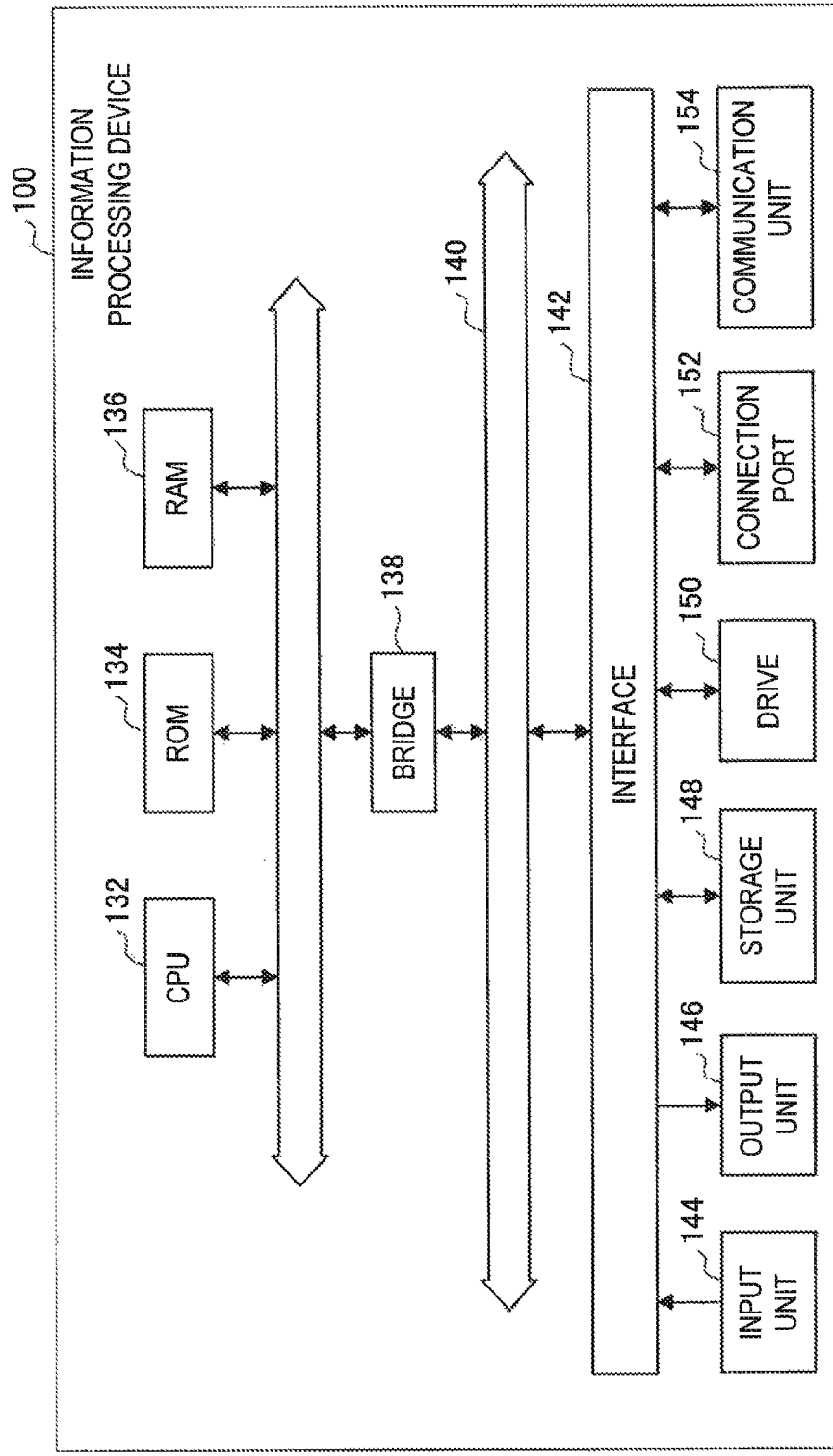

INFORMATION PROCESSING DEVICE, INFORMATION PROCESSING SYSTEM, INFORMATION PROCESSING METHOD, AND PROGRAM

CROSS REFERENCE TO RELATED APPLICATIONS

This application claims the benefit of Japanese Priority Patent Application JP 2014-025683 filed Feb. 13, 2014, the entire contents of which are incorporated herein by reference.

BACKGROUND

The present disclosure relates to an information processing device, an information processing system, an information processing method, and a program.

The recent development of information and communication technology increases the amount of information obtainable by the user. Thus, software for information retrieval for allowing a user to acquire the useful information among the enormous amount of information is developed and provided to the user.

For example, JP 2011-146026A discloses a system that allows data structures containing tag information related to geographical location information or temporal information to be stored in a repository and retrieves a data structure containing the tag information in response to data request from a terminal based on a geographical location or temporal information of the terminal.

Meanwhile, JP 2002-117061A discloses a method for setting a character string of natural sentence format as an input for retrieval, specifying a previously associated keyword based on a keyword obtained by performing natural language processing on the input character string of natural language format, and performing retrieval using the specified keyword.

SUMMARY

However, the inventions disclosed in JP 2011-146026A and JP 2002-117061A have difficulties in performing information retrieval in which indirect relevance to a retrieval key is maintained reliably.

For example, according to the disclosure in JP 2011-146026A, it may be possible to retrieve a data structure having tag information related to location information of a terminal that is set as a retrieval key. However, a data structure containing relevant tag information is difficult to be retrieved using information related to the location information, for example, history information regarding a region connected to the location information.

Furthermore, according to the disclosure in JP 2002-117061A, information indirectly related to an input retrieval key may be retrieved by performing retrieval using a retrieval key associated with the input retrieval key. However, the relationship between the input retrieval key and information to be retrieved depends to an association between retrieval keys defined previously, and thus their relationship is difficult to maintain reliably.

Therefore, according to an embodiment of the present disclosure, there is provided a novel and improved information processing device, information processing system, information processing method, and program, capable of presenting information relevant to the user's desired information.

According to an embodiment of the present disclosure, there is provided an information processing device including a storage unit configured to store identification data and attribute data of each of a plurality of pieces of content, the attribute data being associated with the identification data, and a retrieval unit configured to specify attribute data corresponding to a retrieval key and perform retrieval of identification data related to another attribute data associated with identification data related to the specified attribute data.

According to another embodiment of the present disclosure, there is provided an information processing system including an information processing device including a storage unit configured to store a plurality pieces of content, a structured data generation unit configured to generate identification data and attribute data of each of a plurality of pieces of content stored in the storage unit, the attribute data being associated with the identification data, and a communication unit configured to transmit identification data and attribute data of content generated by the structured data generation unit and transmit a retrieval key; and a server including a communication unit configured to receive identification data and attribute data of content and receive a retrieval key, a storage unit configured to store identification data and attribute data of content that has been received, and a retrieval unit configured to specify attribute data corresponding to retrieval key that has been received and perform retrieval of identification data related to another attribute data associated with identification data related to attribute data that has been specified. The communication unit of the server transmits a result obtained by retrieval to the information processing device.

According to another embodiment of the present disclosure, there is provided an information processing method including storing identification data and attribute data of each of a plurality of pieces of content, the attribute data being associated with the identification data, and specifying attribute data corresponding to a retrieval key and performing retrieval of identification data related to another attribute data associated with identification data related to the specified attribute data.

According to another embodiment of the present disclosure, there is provided a program for causing a computer to execute the functions of storing identification data and attribute data of each of a plurality of pieces of content, the attribute data being associated with the identification data, and specifying attribute data corresponding to a retrieval key and performing retrieval of identification data related to another attribute data associated with identification data related to the specified attribute data.

According to one or more embodiments of the present disclosure, there is provided a novel and improved information processing device, information processing system, information processing method, and program, capable of presenting information related to the user's desired information. Note that the present disclosure is not limited to the effect stated above and in addition to or in place of the effect stated above, may achieve any of the effects indicated in this specification or effects that can be understood from the specification.

BRIEF DESCRIPTION OF THE DRAWINGS

FIG. 1 is a diagram illustrated to describe an overview of an information processing device according to an embodiment of the present disclosure;

FIG. 11 is a diagram illustrated to describe the hardware configuration of the information processing device according to an embodiment of the present disclosure.

DETAILED DESCRIPTION OF THE EMBODIMENT(S)

Figure 2:
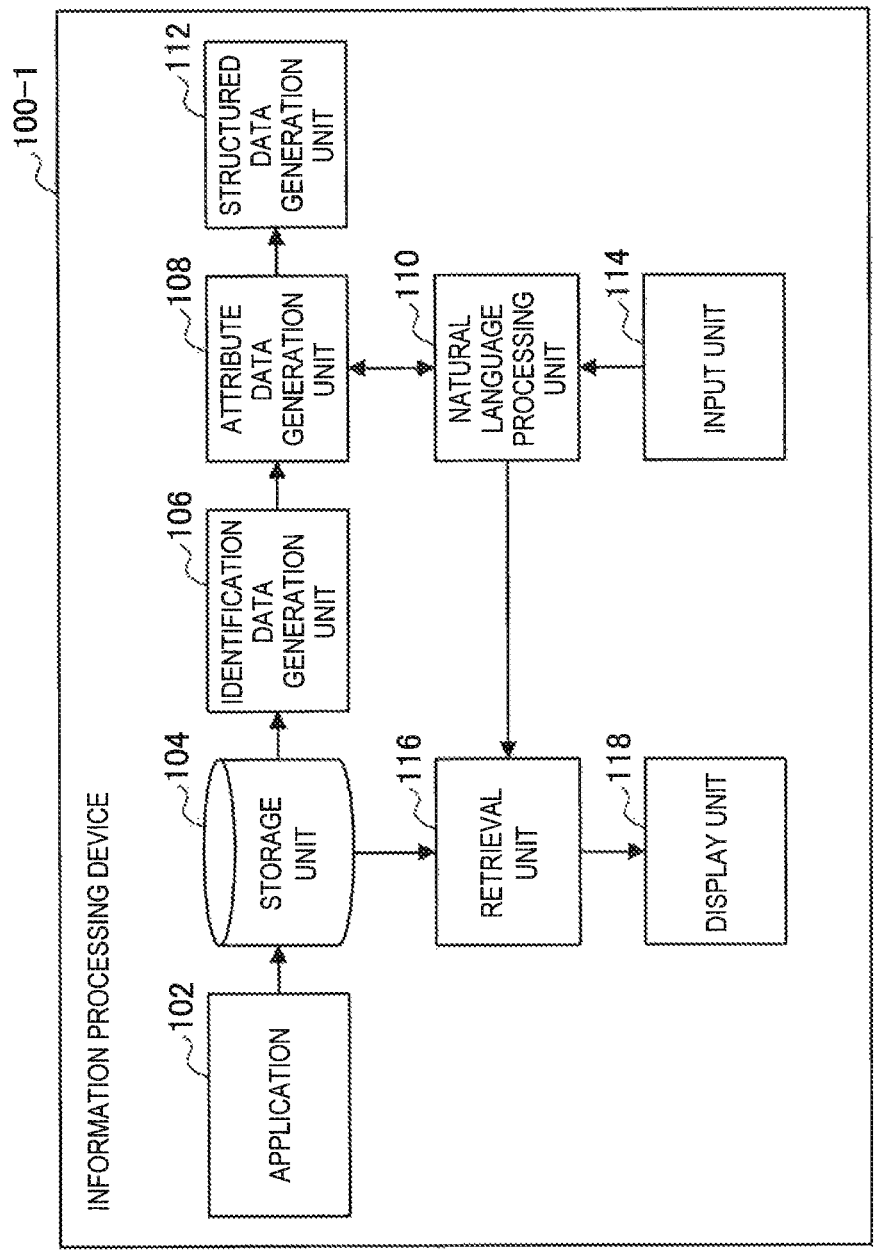
FIG. 2 is a schematic block diagram illustrating a functional configuration of an information processing device according to a first embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The description will be made in the following order.
1. Overview of information processing device according to embodiment of present disclosure
2. First embodiment of present disclosure (example of information processing device)
   2-1. Configuration of information processing device
   2-2. Processing by information processing device
   2-3. Modification
3. Second embodiment of present disclosure (example of system including information processing device and server)
   3-1. Configuration of system
   3-2. Processing by system
   3-3. Modification
4. Hardware configuration of information processing device according to embodiment of present disclosure
5. Conclusion

1. OVERVIEW OF INFORMATION PROCESSING DEVICE ACCORDING TO EMBODIMENT OF PRESENT DISCLOSURE

Referring now to FIG. 1, an overview of an information processing device according to an embodiment of the present disclosure is described. FIG. 1 is a diagram illustrated to describe an overview of an information processing device according to an embodiment of the present disclosure.

The information processing device 100 illustrated in FIG. 1 is provided with functions of storing a plurality pieces of content associated with an application and performing retrieval of the content. In addition, the information processing device 100 is configured to include a display unit 118 for displaying a result obtained by retrieval of the content. Thus, the information processing device 100 can retrieve content associated with an application and display a retrieval result on the display unit 118.

For example, the information processing device 100, when receiving an input character string as a retrieval key as shown in the left part of FIG. 1, can retrieve content related to the retrieval key and display a list or other representation of the retrieved content on the display unit 118 as retrieval results.

The function of retrieving content or other data typically is retrieving content or other data that is directly related to the input retrieval key. Thus, when a user intends to retrieve content related to the content retrieved using a retrieval key, that is, content indirectly related to the retrieval key, the user performs retrieval by entering a retrieval key used to retrieve content that is indirectly related to another retrieval key. Thus, the information processing device 100 retrieves content related to the retrieval key and content related to the content.

For example, as shown in the left part of FIG. 1, the information processing device 100, when receiving an input of "materials of ABC meeting" as a retrieval key by the user, retrieves content related to the retrieval key. For example, the information processing device 100 may retrieve content "material 1 (for ABC meeting)" or the like that is directly related to the retrieval key "materials for ABC meeting".

Furthermore, the information processing device 100 retrieves content related to the content "material 1 (for ABC meeting)" or the like retrieved to be directly related to the retrieval key. For example, the information processing device 100 may retrieve schedule information "schedule (of a person named A)" of a person who attended the ABC meeting, contact information "mail address (of a person named A)" of a person who attended the ABC meeting, or other information. Then, the information processing device 100 may display a result obtained by retrieval on the display unit 118 as shown in the right part of FIG. 1. In addition, the information processing device 100 may retrieve information "schedule (for XYZ meeting)" or "materials (for XYZ meeting)" regarding the XYZ meeting to be held in the same day as the ABC meeting.

In this way, the information processing device 100 according to an embodiment of the present disclosure retrieves content that is indirectly related to a retrieval key. This allows content relevant to the users desired content to be presented to the user. FIG. 1 illustrates a smartphone as an example of the information processing device 100, but the information processing device 100 includes tablet terminals, personal digital assistants (PDAs), wearable terminals, personal computers, host computers, and television set. In addition, for convenience of description, the distinction between the information processing devices 100 according to the first and second embodiments are performed by giving a number corresponding to each embodiment to the end of the reference numeral, like information processing device 100-1 and information processing device 100-2.

2. FIRST EMBODIMENT OF PRESENT DISCLOSURE (EXAMPLE OF INFORMATION PROCESSING DEVICE)

An overview of the information processing device 100 according to an embodiment of the present disclosure has been described. An information processing device 100-1 according to a first embodiment of the present disclosure will be described. The information processing device 100-1 according to the first embodiment generates structured data from content and performs retrieval or other processing based on the generated structured data, as a stand-alone unit.

[2-1. Configuration of Information Processing Device]

Referring now to FIG. 2, the configuration of the information processing device 100-1 according to the first embodiment of the present disclosure is described. FIG. 2 is a schematic block diagram illustrating the functional configuration of the information processing device 100-1 according to the first embodiment of the present disclosure.

As shown in FIG. 2, the information processing device 100-1 is configured to include an application 102, a storage unit 104, an identification data generation unit 106, an attribute data generation unit 108, a natural language processing unit 110, a structured data generation unit 112, an input unit 114, a retrieval unit 116, and a display unit 118.

The application 102 performs an application-specific process and generates content regarding an application. For example, the application 102 may include a schedule management application, an electronic mail application, and an image generation application. In addition, the generated content may be schedule data, mail data, and images. The generated content is stored in the storage unit 104. In addition, there may be a plurality of types of applications 102, and the applications 102 may generate content regarding their respective applications.

The storage unit 104 stores information regarding the content generated by the application 102, and specifically, stores the main body of content, structured data composed of identification data and attribute data of content, which will be described later, and so on.

Figure 3:
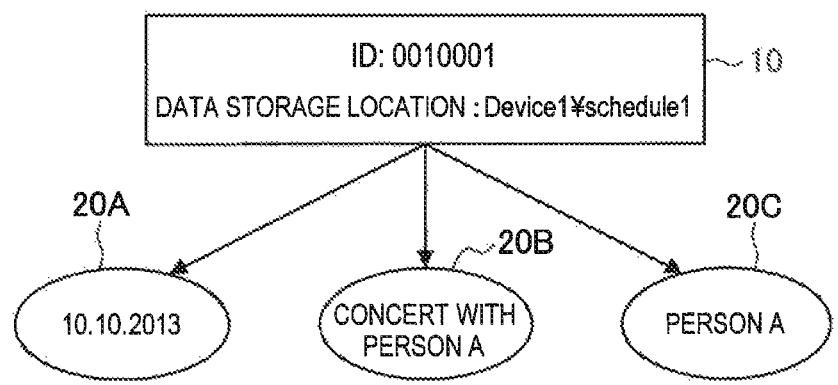
FIG. 3 is a diagram illustrating an example of structured data composed of identification data and attribute data generated by the information processing device according to the present embodiment.

The identification data generation unit 106 generates identification data of the content stored in the storage unit 104. Specifically, the identification data generation unit 106 generates identification data that contains an identifier (ID) corresponding to content and information indicative of a storage location of the content. For example, referring to FIG. 3, an example of identification data is described. FIG. 3 is a diagram illustrating an example of structured data composed of identification data and attribute data, which are generated by the information processing device 100-1 according to the present embodiment. For example, the identification data generation unit 106 may generate identification data 10 that contains an ID "0010001" and data storage location "Device1¥schedule1", as shown in FIG. 3, for the content generated by the schedule management application. The ID may be configured as an ID of the application that generates content and an ID of the content that is unique in the application.

The attribute data generation unit 108 generates attribute data of the content stored in the storage unit 104. Specifically, the attribute data generation unit 108 extracts data that may be used as a retrieval key from data contained in the content and sets the extracted data as attribute data. For example, referring to FIG. 3, the attribute data and an attribute data generation process are described.

The attribute data generation unit 108 determines the type of data contained in the content and sets data obtained by performing processing for each of the determined type of data as attribute data. For example, the attribute data generation unit 108 may determine the type of data of title information "going to concert with person named A" and the date and time information "2013.10.10" contained in the content with regard to the content generated by the schedule management application.

If it is determined that the type of data contained in the content is text data, then the attribute data generation unit 108 causes the data to be processed by the natural language processing unit 110, and sets a character string extracted by the natural language processing unit 110 as attribute data. For example, the attribute data generation unit 108 may determine that title information "going to concert with a person named A" contained in the content is text data and causes the data to be processed by the natural language processing unit 110. Then, the attribute data generation unit 108 may set "concert with a person named A" and "a person named A" extracted by the natural language processing unit 110 as attribute data 20B and attribute data 20C, respectively, as shown in FIG. 3. In this way, the attribute data generation unit 108 sets the character string, which is extracted by the natural language processing unit 110 from data contained in the content, as attribute data. This allows the user to retrieve content by setting the character string used by the user at the time of generation of content as a retrieval key.

Furthermore, if it is determined that data contained in the content is data other than text data, then the attribute data generation unit 108 sets data contained in the content as attribute data. For example, the attribute data generation unit 108 determines that the date and time information "2013.10.10" contained in the content is data other than text data, and may set the information "2013.10.10" as attribute data 20A, as shown in FIG. 3. An example of data other than text data includes an image capturing date and time and the global positioning system (GPS) data when the content is images.

The natural language processing unit 110 extracts a character string from text data. Specifically, the natural language processing unit 110 performs language processing on the content of text data and extracts a character string corresponding to the predefined named entity from the content, based on the instruction of the attribute data generation unit 108. For example, when the content is mail data, the natural language processing unit 110 may extract named entities including the names of person, place, and building from a title part of the mail. The language processing may use a typical natural language processing technique.

The structured data generation unit 112 generates structured data in which attribute data of the content is associated with identification data corresponding to content. Specifically, the structured data generation unit 112 performs an association between identification data corresponding to the content generated by the identification data generation unit 106 and attribute data of the content generated by the attribute data generation unit 108. In addition, the structured data generation unit 112 stores identification data and attribute data associated with each other as a set of structured data in the storage unit 104. For example, the structured data may be configured to include the identification data 10 and the attribute data 20A to 20C, as shown in FIG. 3, and include association information that indicates an association between identification data and attribute data. The structured data generation unit 112 may set only associating information between the identification and attribute data as structured data, and may store each of identification data, attribute data, and associating information in the storage unit 104 in an independent way from each other. The identification data generation unit 106, the attribute data generation unit 108, and the structured data generation unit 112 may perform their respective processing operations when new content is created and the created content is stored in the storage unit 104.

In this way, the structured data is generated by the structured data generation unit 112 that is provided in the information processing device 100-1. Thus, even when new content is created by an application of the information processing device 100-1, the content can be a target to be retrieved.

Furthermore, the structured data generation unit 112 generates structured data of each piece of content contained in a plurality of applications. Accordingly, the identification data of structured data generated from the content is allowed to be a target to be retrieved, and thus content generated by a plurality of applications can be retrieved collectively. Thus, the necessity for the user to perform retrieval for each of a plurality of applications can be eliminated, thereby avoiding complicated tasks.

The input unit 114 detects user input. Specifically, the input unit 114 detects user input and causes the detected user input to be processed by the natural language processing unit 110. For example, the input unit 114 can detect keyboard input, audio input, gesture input, or other types of input. In addition, if the detected input is not text data, the input unit 114 may convert the input into text data. The character string extracted by the natural language processing unit 110 is transmitted to the retrieval unit 116 as a retrieval key.

Figure 4:
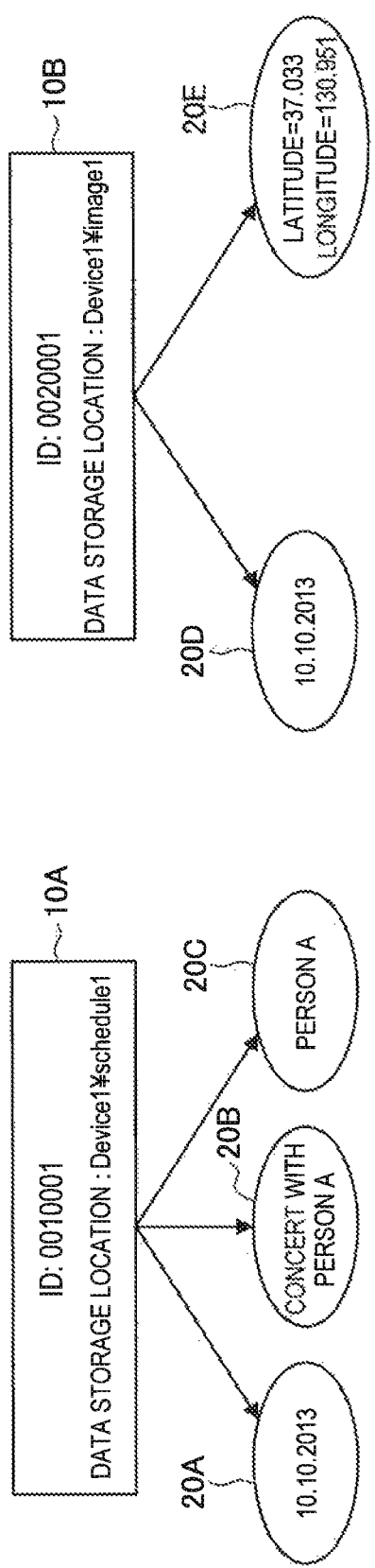
FIG. 4 is a diagram illustrated to describe an example of a retrieval process performed by the information processing device according to the present embodiment.

The retrieval unit 116 retrieves content that is directly related to a retrieval key and content that is indirectly related to a retrieval key. Specifically, the retrieval unit 116 specifies attribute data corresponding to a retrieval key and retrieves identification data related to another attribute data that is associated with identification data related to the specified attribute data. For example, referring to FIG. 4, a retrieval process is described. FIG. 4 is a diagram illustrated to describe an example of a retrieval process performed by the information processing device 100-1 according to the present embodiment.

The retrieval unit 116 refers to the structured data stored in the storage unit 104, and specifies attribute data corresponding to the retrieval key extracted by the natural language processing unit 110. For example, when a retrieval key "concert with a person named A" is extracted by the natural language processing unit 110, the retrieval unit 116 retrieves attribute data of the structured data stored in the storage unit 104 and specifies attribute data 20B that matches the retrieval key as shown in FIG. 4. For example, a method of specifying attribute data may be a way to specify a character string that, either partially or fully, matches the stored character string or a character string that satisfies a predetermined condition In this way, the retrieval unit 116 performs retrieval using the retrieval key extracted from the input data by the natural language processing unit 110. The input data of a natural sentence format is a target as input for retrieval, and thus the user can perform retrieval by intuitive input.

Then, the retrieval unit 116 adds identification data related to the specified attribute data to the retrieval result. For example, the retrieval unit 116 adds identification data 10A related to the specified attribute data 20B to the retrieval result.

Then, the retrieval unit 116 retrieves identification data related to another attribute data that is associated with identification data related to the specified attribute data. Specifically, the retrieval unit 116 retrieves attribute data that is in an inclusion relation with the other attribute data and adds identification data related to the retrieved attribute data to the retrieval result. For example, the retrieval unit 116 may retrieve attribute data, for example, "2013.10.10", "2013.10", or "2013.10.10.PM.14:30", which is in an inclusion relation with the attribute data 20A "2013.10.10" that is different from the attribute data 20B of the identification data 10A. Then, the retrieval unit 116 may add identification data 10B related to the retrieved attribute data 20D as shown in FIG. 4 to the retrieval result.

In this way, the retrieval unit 116 determines whether there is a relationship between attribute data and identification data. The determination is performed based on the inclusion relation between attribute data and another attribute data that is associated with identification data to be determined. Accordingly, the range of targets to be retrieved is expanded while maintaining the relationship, and thus it is possible to provide more relevant retrieval results for the user.

The retrieval unit 116 retrieves identification data related to another attribute data that is associated with the retrieved identification data. This retrieval is performed for each of the retrieved identification data until there will be no identification data to be retrieved. For example, the retrieval unit 116 retrieves identification data related to another attribute data 20E that is associated with the retrieved identification data 10B as shown in FIG. 4, and if there is no relevant identification data, then the retrieval process is ended.

The display unit 118 displays the retrieval result obtained by the retrieval unit 116. Specifically, the display unit 118 displays a list of information of content corresponding to each of identification data in a list of the identification data obtained by the retrieval process performed by the retrieval unit 116. For example, the display unit 118 may display a list of file names linked to the content.

[2-2. Processing by Information Processing Device]

The processing performed by the information processing device 100-1 according to the present embodiment will be described. The processing performed by the information processing device 100-1 is divided into a structured data generation process and a content retrieval process, and the description will be made for each individual process.

(Structured Data Generation Process)

Figure 5:
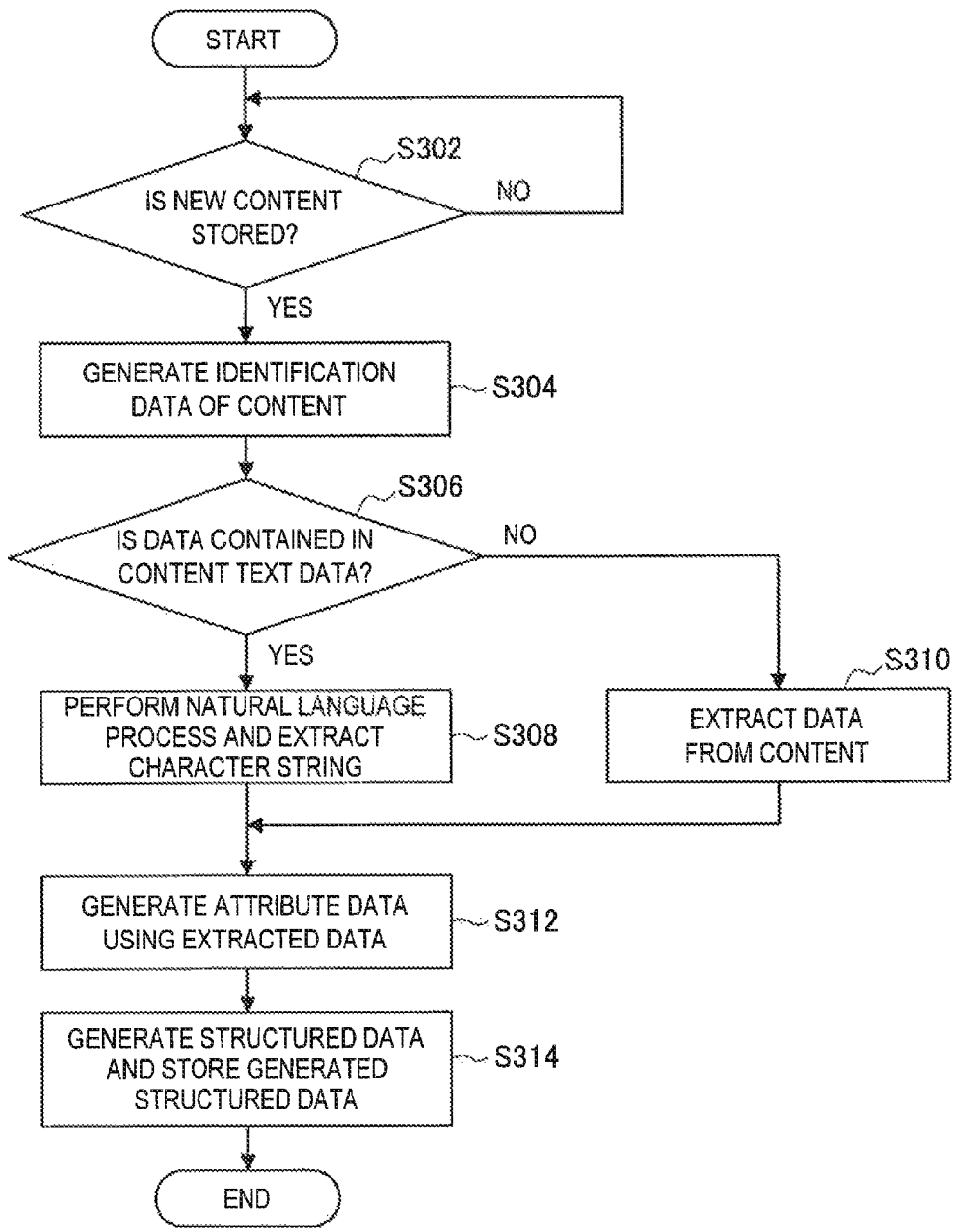
FIG. 5 is a flowchart schematically illustrating a structured data generation process performed by the information processing device according to the present embodiment.

Referring now to FIG. 5, a structured data generation process is described. FIG. 5 is a flowchart schematically illustrating a structured data generation process performed by the information processing device 100-1 according to the present embodiment.

The information processing device 100-1 determines whether new content is stored (step S302).

If new content is stored in step S302, then the information processing device 100-1 generates identification data of the content (step S304). Specifically, if the content generated by the application 102 is stored in the storage unit 104, then the identification data generation unit 106 generates identification data related to the generated content.

Then, the information processing device 100-1 determines whether data contained in the content is text data (step S306). Specifically, if identification data is generated, then the attribute data generation unit 108 determines whether data contained in the content is text data for generation of attribute data.

If it is determined that data contained in the content is text data in step S306, then the information processing device 100-1 performs a natural language process and extracts a character string (step S308). Specifically, the attribute data generation unit. 108 causes the data that is determined to be text data to be processed by the natural language processing unit 110 and acquires a character string extracted by the natural language processing unit 110.

If it is not determined that data contained in the content is text data in step S306, then the information processing device 100-1 extracts data from the content (step S310). Specifically, the attribute data generation unit 108 acquires data contained in the content from the content.

Then, the information processing device 100-1 generates attribute data using the extracted data (step S312). Specifically, the attribute data generation unit 108 generates attribute data that contains extracted character strings or data.

Then, the information processing device 100-1 generates structured data and stores the generated structured data (step S314). Specifically, the structured data generation unit 112 associates the generated identification data with the attribute data, generates structured data composed of identification data, attribute data, and association information, and stores the generated structured data in the storage unit 101.

(Content Retrieval Process)

Figure 6:
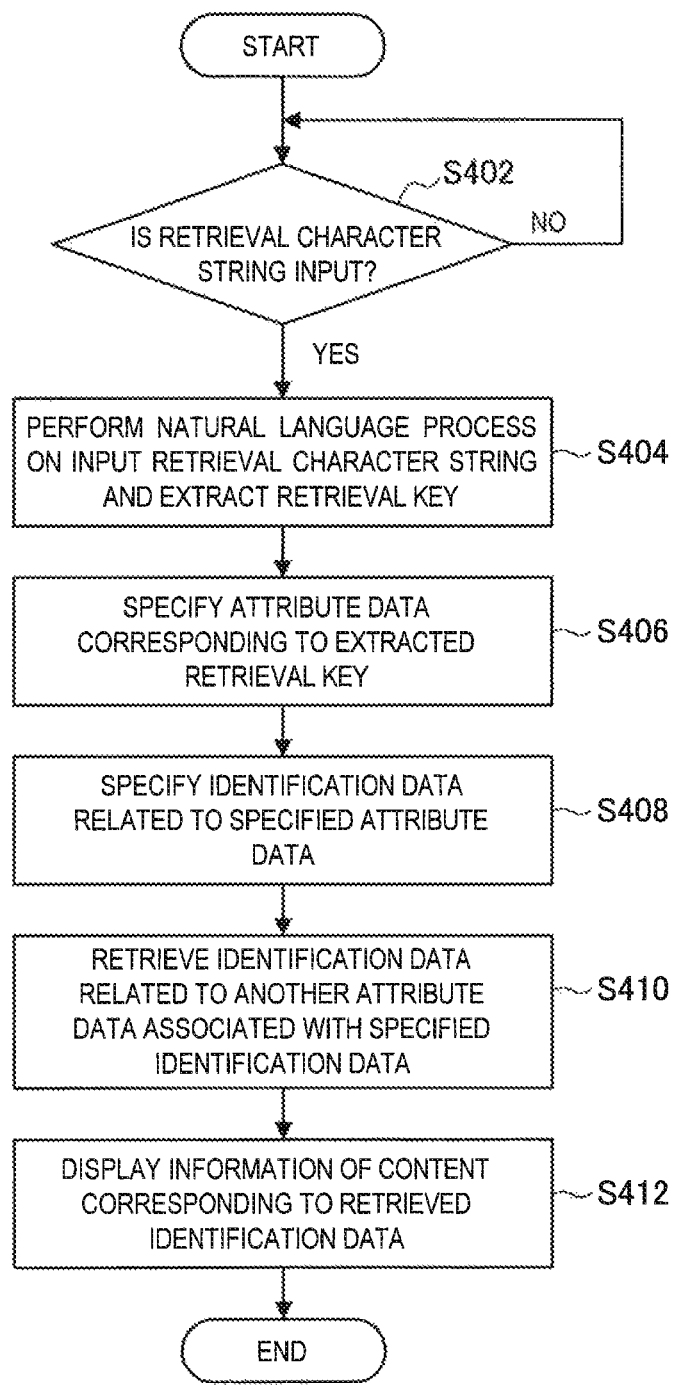
FIG. 6 is a flowchart schematically illustrating a content retrieval process performed by the information processing device according to the present embodiment.

Referring now to FIG. 6, a content retrieval process is described. FIG. 6 is a flowchart schematically illustrating a content retrieval process performed by the information processing device 100-1 according to the present embodiment.

The information processing device 100-1 determines whether a retrieval character string is inputted (step S402).

If a retrieval character string is inputted in step S402, then the information processing device 100-1 performs a natural language process on the input retrieval character string and extracts a retrieval key (step S404). Specifically, if the input unit 114 detects a retrieval character string, then the natural language processing unit 110 performs language processing on the detected character string and extracts a character string to be used as a retrieval key.

Then, the information processing device 100-1 specifies attribute data corresponding to the extracted retrieval key (step S406). Specifically, the retrieval unit 116 refers to attribute data stored in the storage unit 104 and specifies attribute data corresponding to the retrieval key extracted by the natural language processing unit 110.

Next, the information processing device 100-1 specifies identification data related to the specified attribute data (step S408). Specifically, the retrieval unit 116 refers to association information of the structured data related to the specified attribute data and specifies identification data associated with the specified attribute data.

Then, the information processing device 100-1 retrieves identification data related to another attribute data that is associated with the specified identification data (step S410). Specifically, the retrieval unit 116 refers to association information of the structured data related to the specified identification data and retrieves identification data related to another attribute data that is associated with the specified identification data Next, the information processing device 100-1 displays information of the content corresponding to the retrieved identification data (step S412). Specifically, the display unit 118 displays information of the content corresponding to the identification data retrieved by the retrieval unit 116, for example, a list of file names of the content.

In this way, according to the first embodiment of the present disclosure, the information processing device 100-1 stores identification data and attribute data of each content of multiple content items and retrieves identification data related to another attribute data that is associated with the identification data related to attribute data corresponding to a retrieval key. Thus, it is possible to present information relevant to the user's desired information. For example, data such as images or videos are typically difficult to be retrieved using natural language, but retrieval of such data using natural language is possible according to the embodiment of the present disclosure.

[2-3. Modification]

The first embodiment of the present disclosure has been described. The present embodiment is not limited to the exemplary embodiment described above. The first to third modifications of the present embodiment will be described.

(First Modification)

In the first modification of the present embodiment, the retrieval unit 116 may perform a retrieval process when the number of attribute data contained counting from another attribute data that is associated with identification data related to attribute data corresponding to a retrieval key (hereinafter, also referred to as "number of contained attribute data") is equal to or smaller than a predetermined number.

For example, the retrieval unit 116 can specify another identification data that is associated with identification data related to the attribute data corresponding to a retrieval key.

Then, the retrieval unit 116 may retrieve identification data that is directly related to the specified other attribute data and may specify attribute data, which is different from the specified other attribute data and is associated with the retrieved identification data, as another retrieval key. The retrieval unit 116 may increment the number of contained attribute data when specifying attribute data. For example, if two pieces of identification data that are directly related to the initially specified other attribute data are detected, increment is performed independently of each other in specifying each attribute data of two pieces of identification data, and a count is increased from 0 to 1.

Next, the retrieval unit 116 may determine whether a count reaches a predetermined number. If it is determined that a count reaches a predetermined number, then the retrieval unit 116 stops setting the specified attribute data as a retrieval key and does not perform retrieval of identification data related to the attribute data. If it is not determined that a count reaches a predetermined number, the retrieval unit 116 retrieves identification data related to the specified attribute data. If there is no attribute data used as a retrieval key any more, the retrieval unit 116 ends the retrieval process.

Although an example in which the retrieval unit 116 performs the retrieval process when the number of contained attribute data is equal to or smaller than the predetermined number has been described, the retrieval unit 116 may perform the retrieval process when the number of contained identification data is equal to or smaller than a predetermined number.

In this way; according to the first modification of the present embodiment, the retrieval unit 116 performs a retrieval process when the number of contained attribute data counting from another attribute data associated with identification data connected to attribute data corresponding to a retrieval key is equal to or smaller than a predetermined number. Thus, the amount of identification data to be retrieved is reduced, resulting in a decrease in time and processing load necessary for retrieval. As the number of the contained attribute data increases, the relevance to a retrieval key is considered to be low, and even when the retrieval process performed in a condition where the number of contained attribute data is equal to or smaller than a predetermined number, it is considered to be less likely to be disadvantageous to the user.

The predetermined number related to the number of contained attribute data may be set by the user. Specifically, the input unit 114 detects input of the predetermined number by the user and stores the detected predetermined number in the storage unit 104. Then, the retrieval unit 116 performs the retrieval process based on the predetermined number stored in the storage unit 104. In this case, the range to be retrieved is defined by the user, and thus targets to be retrieved and time necessary for retrieval can be configurable according to the user's intention.

(Second Modification)

Figure 7:
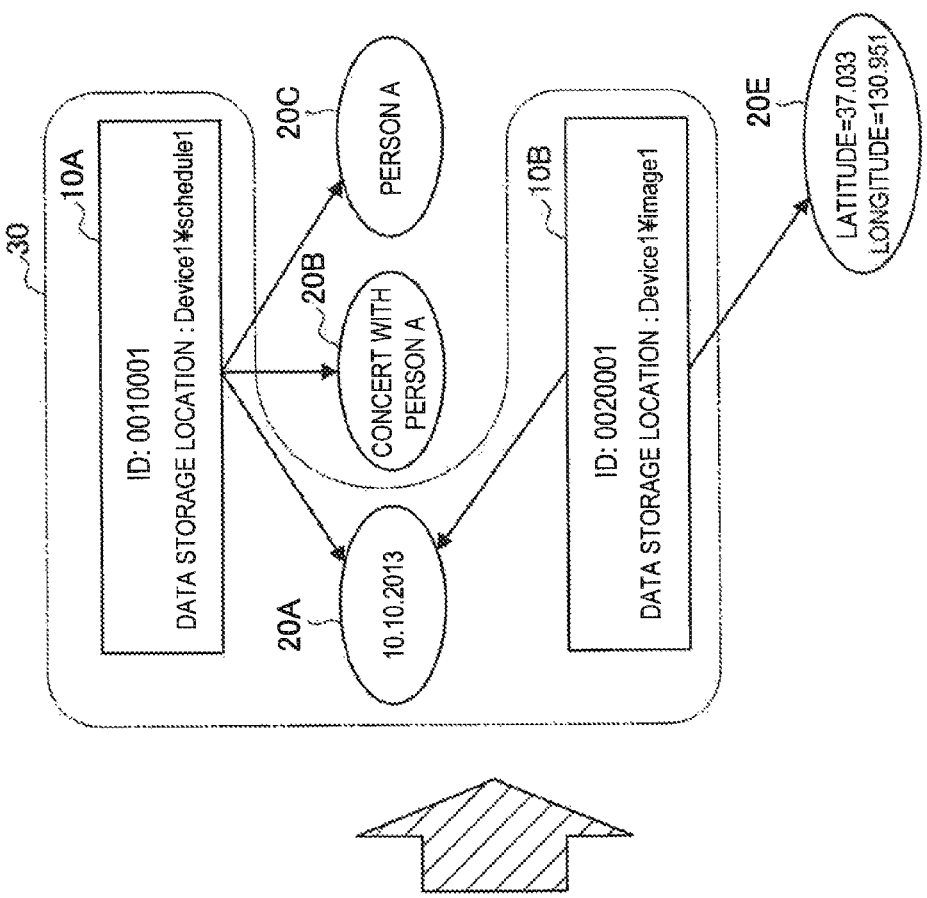
FIG. 7 is a diagram illustrated to describe an example of a link generated by an information processing device according to a second modification of the present embodiment.

In the second modification of the present embodiment, the information processing device 100-1 further includes a link generation unit that generates a link between identification data and another identification data related to attribute data associated with the identification data, and the retrieval unit 116 may perform a retrieval process using a link generated by the link generation unit. For example, referring to FIG. 7, a link that is generated by the link generation unit is described. FIG. 7 is a diagram illustrated to describe an example of a link generated by an information processing device 100-1 according to the second modification of the present embodiment.

The storage unit 104 stores structured data generated by the structured data generation unit 112. For example, as shown in the left part of FIG. 7, the storage unit 104 may store structured data composed of identification data 10A and attribute data 20A to 20C associated with the identification data 10A and structured data composed of identification data 10B and attribute data 20D and 20E associated with the identification data 10B.

The link generation unit then generates a link between identification data and another identification data related to attribute data associated with the identification data based on the structured data stored in the storage unit 104, and stores the generated link in the storage unit 104. For example, the link generation unit may specify the identification data 10A and attribute data, for example, attribute data 20D that matches attribute data associated with the identification data 10A, for example, attributed data 20A. The link generation unit may generate a link 30 between the identification data 10B associated with attribute data 20D and the identification data 10A as shown in the left part of FIG. 7 and store the generated link 30 in the storage unit 104. The link 30 may be configured to include association information between identification data, and include attribute data connected to the association.

Then, the retrieval unit 116 performs a retrieval process using a link generated by the link generation unit. For example, the retrieval unit 116, when specifying attribute data 20B corresponding to a retrieval key as shown in the right part of FIG. 7, specifies the identification data 10A related to the specified attribute data. The retrieval unit 116 then specifies the identification data 10B to be associated with the identification data 10A based on the link 30 connected to the specified identification data 10A.

In this way, according to the second modification of the present embodiment, the information processing device 100-1 further includes the link generation unit for generating a link between identification data and another identification data related to attribute data that is associated with the identification data, and the retrieval unit 116 performs a retrieval process using a link generated by the link generation unit. This makes the time for retrieval shorter, resulting in improvement of user convenience.

The information processing device 100-1 may display content corresponding to identification data at a link destination of identification data contained in the content of the application 102 in response to the activation of the application 102 or action of browsing or other similar use of content. For example, when the user activates a scheduler, the information processing device 100-1 may display content, for example, "materials for ABC meeting" corresponding to the identification data that is linked to content of the scheduler, for example, schedule information "ABC meeting". In this case, the content corresponding to the identification data at the link destination can be displayed automatically, which results in improvement of user convenience.

(Third Modification)

In the third modification of the present embodiment, the display unit 118 may display information of content corresponding to some identification data from among identification data retrieved by the retrieval unit 116. Specifically, the display unit 118 displays information of content corresponding to identification data specified based on a category to which identification data belongs from among the retrieved identification data. For example, the identification data further include information regarding the category, and the display unit 118 may refer to information regarding to each category of the retrieved identification data, for example, the type of content such as, images, video, and text, and may specify identification data that contains information regarding a particular category. The display unit 118 then may display a file name of the content corresponding to the specified identification data. The category to be displayed may be set by user input.

The category to be displayed may be included in a retrieval character string inputted by the user and may be extracted from the retrieval character string by the natural language processing unit 110. Specifically, the natural language processing unit 110 determines whether the character string extracted from the character string detected by the input unit 114 is a character string indicating a category. If it is determined that the extracted character string is a character string indicating a category, the natural language processing unit 110 supplies the character string to the display unit 118, and the display unit 118 displays information of the content corresponding to the identification data specified based on the character string. For example, when the user enters a retrieval character string "picture from when went to a concert", the natural language processing unit 110 extracts character strings "concert" and "picture" and determines whether each of the extracted character strings is a character string indicating a category. In this case, the character string "picture" is determined to be a character string indicating a category, and the natural language processing unit 110 may supply the character string as a category to the display unit 118. Then, the display unit 118 may display a file name or other data of the content corresponding to the identification data having a category of "picture". In this case, a category is set from the retrieval character string inputted by the user, and thus it is possible to eliminate a category setting function and a category setting operation by the user. The retrieval unit 116 may be configured to prevent identification data in a category from being retrieved. This allows the amount of results obtained from the retrieval process to be reduced, which results in a decrease in computational resources and processing load necessary for the display process.

The display unit 118 may display information of the content corresponding to the identification data depending on the number of attribute data contained, counting from another attribute data associated with identification data related to the attribute data corresponding to a retrieval key at the time of retrieval, from among the retrieved identification data. For example, the retrieval unit 116 may store the number of contained attribute data to be corresponded to identification data at the time of retrieval of the identification data, and the display unit 118 may display information of the content in which the stored number of contained attribute data is corresponded to identification data of the predetermined number, for example, the number set by user input, from among the retrieved identification data.

Although an example in which the display unit 118 displays information of the content corresponding to identification data related to a predetermined number of contained attribute data has been described, the display unit 118 may display identification data within a predetermined range when the identification data are arranged in a predetermined order with regard to the number of contained attribute data. For example, the display unit 118 may display information of the content corresponding to each of the identification data arranged in $30^{th}$ to $60^{th}$ positions from the head when the retrieved identification data are arranged in ascending order of the number of the contained attribute data. The predetermined order and range may be set by user input. In this case, information of the content corresponding to each of the identification data having different number of contained attribute data is displayed, and thus the user can check the retrieval results efficiently.

In this way, according to the third modification of the present embodiment, the display unit 118 displays information of the content corresponding to some identification data from among identification data retrieved by the retrieval unit 116. Accordingly, the user can refer to the selected parts of the retrieval results, resulting in improvement of user convenience. Furthermore, the display unit 118 displays information of the content corresponding to the identification data specified based on a category to which identification data belongs from among retrieved identification data. Accordingly, an object to be displayed can be narrowed down to identification data regarding a particular category, and thus it is possible to reduce the burden on an operation of determination of a retrieval result by the user Moreover, the display unit 118 may display information of the content corresponding to the identification data depending on the number of contained attribute data counting from another attribute data that is associated with identification data related to the attribute data corresponding to a retrieval key at the time of retrieval from among the retrieved identification data. Accordingly, information of the content is displayed depending on the degree of relevance to a retrieval key, and thus it is possible to reduce the burden on an operation of determination of a retrieval result by the user.

3. SECOND EMBODIMENT OF PRESENT DISCLOSURE (EXAMPLE OF SYSTEM INCLUDING INFORMATION PROCESSING DEVICE AND SERVER)

The information processing device 100-1 according to the first embodiment of the present disclosure has been described. Subsequently, an information processing system according to a second embodiment of the present disclosure will be described. The information processing system according to the present embodiment is configured to include an information processing device 100-2 and a server 200. The server 200 performs a link generation process for retrieval and a retrieval process.

[3-1. Configuration of System]

Figure 8:
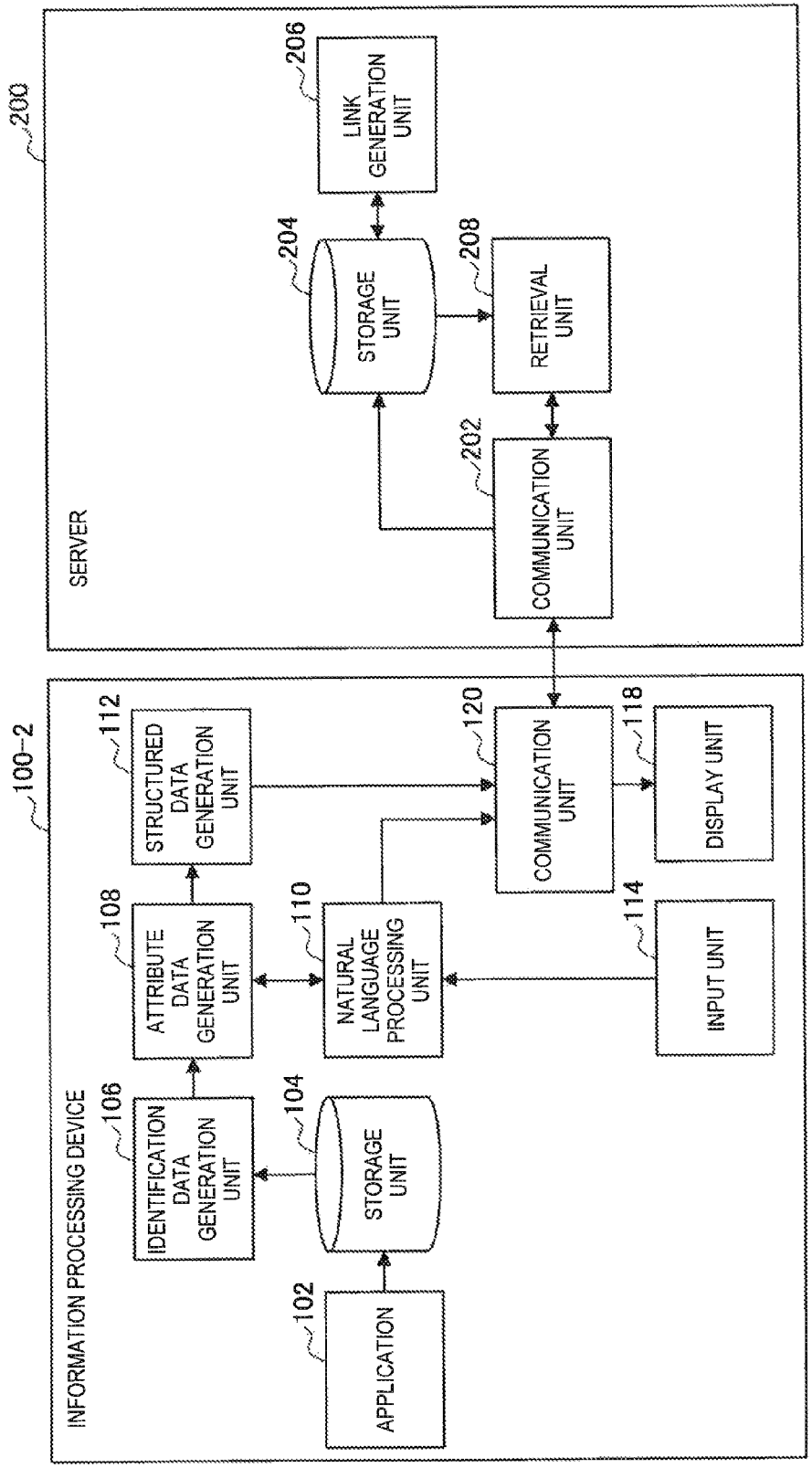
FIG. 8 is a schematic block diagram illustrating a functional configuration of an information processing device and a server that are included in an information processing system according to a second embodiment of the present disclosure.

Referring now to FIG. 8, the configuration of the information processing device 100-2 and the server 200 included in the information processing system according to the second embodiment of the present disclosure is described. FIG. 8 is a schematic block diagram illustrating the functional configuration of the information processing device 100-2 and the server 200 that are included in the information processing system according to the second embodiment of the present disclosure.

As shown in FIG. 8, the information processing device 100-2 is configured to include a communication unit 120, in addition to the application 102, the storage unit 104, the identification data generation unit 106, the attribute data generation unit 108, the natural language processing unit 110, the structured data generation unit 112, the input unit 114, and the display unit 118.

The communication unit 120 communicates with the server 200. Specifically, the communication unit 120 transmits structured data and a retrieval key to the server 200 and receives a retrieval result from the server 200. For example, the communication unit 120 may communicate with the server 200 using wired or wireless communication technologies such as Wi-Fi (registered trademark), Bluetooth (registered trademark), or mobile phone communications. In addition, the communication unit 120 supplies the received retrieval result to the display unit 118.

As shown in FIG. 8, the server 200 is configured to include a communication unit 202, a storage unit 204, a link generation unit 206, and a retrieval unit 208. The server 200 may be a server that provides cloud services.

The communication unit 202 communicates with the information processing device 100-2. Specifically, the communication unit 202 receives structured data and a retrieval key from the information processing device and transmits a result of retrieval using the received retrieval key to the information processing device 100-2.

The storage unit 204 may store structured data received from the communication unit 202 and may store a link generated by the link generation unit 206 which will be described below in detail.

The link generation unit 206 generates a link between identification data based on the structured data stored in the storage unit 204. The processing performed by the link generation unit 206 is substantially similar that performed by the link generation unit according to the second modification of the first embodiment, and thus repeated description will be omitted. In this way, the server 200 including the link generation unit allows computational resources and processing load for the information processing device 100-2 to be reduced.

The retrieval unit 208 retrieves identification data using a link generated by the link generation unit 206. The processing performed by the retrieval unit 208 is substantially similar to that performed by the retrieval unit 208 according to the second modification of the first embodiment, and thus repeated description will be omitted.

[3-2. Processing by System]

Processing performed by the information processing system in the present embodiment will be described. The processing performed by the information processing system is divided into a structured data generation process, a link generation process, and an identification data retrieval process, and thus the description will be made for each individual process.

(Structured Data Generation Process and Link Generation Process)

Figure 9:
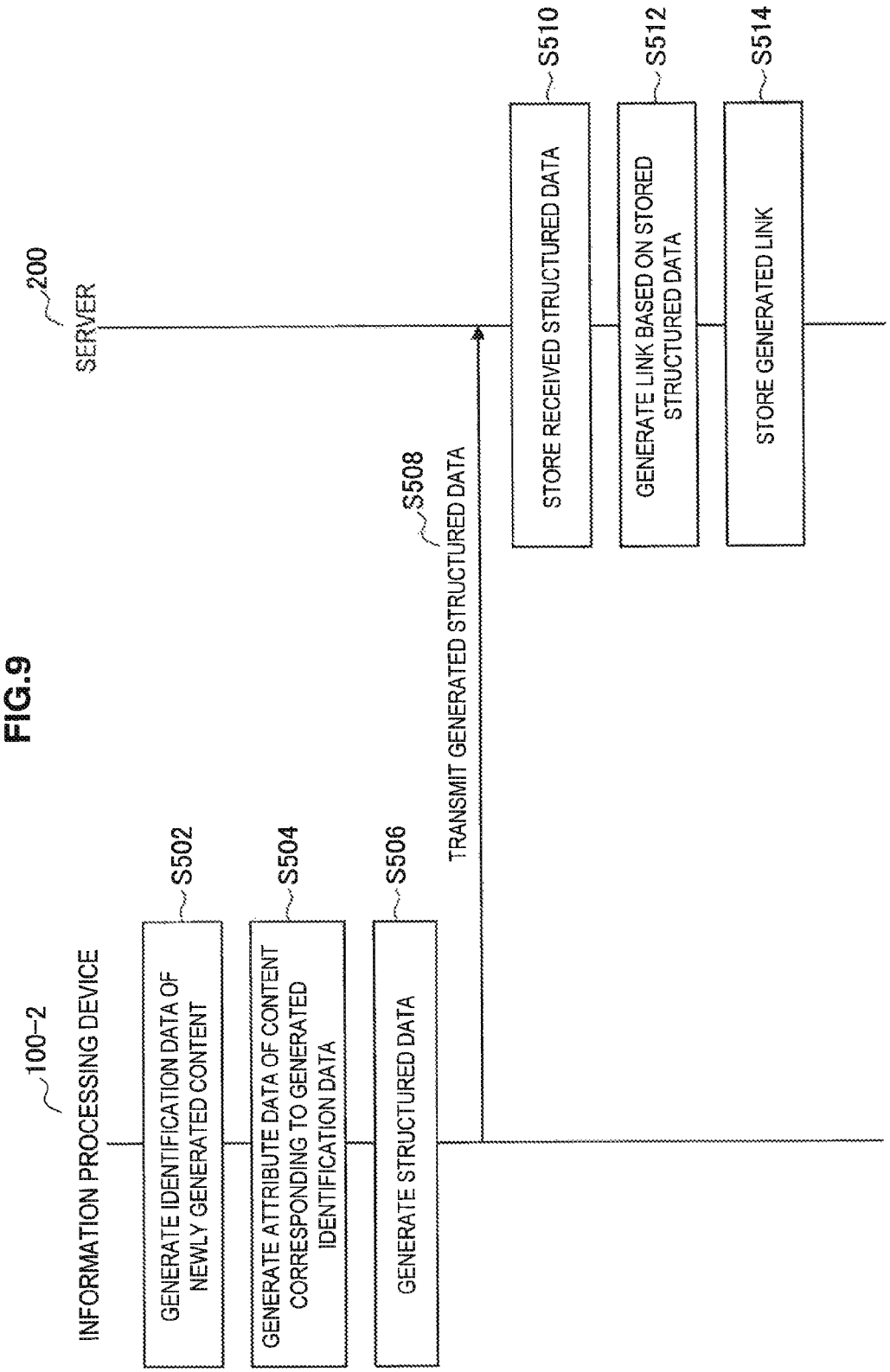
FIG. 9 is a sequence diagram schematically illustrating a structured data generation process and a link generation process performed by the information processing system according to the present embodiment.

Referring now to FIG. 9, a link generation process is described. FIG. 9 is a sequence diagram schematically illustrating a structured data generation process and a link generation process performed by the information processing system according to the present embodiment.

The information processing device 100-2 generates identification data of newly generated content (step S502). Specifically, the identification data generation unit 106 generates identification data corresponding to the content that is newly generated by the application 102 and stored in the storage unit 104.

Then, the information processing device 100-2 generates attribute data of the content corresponding to the generated identification data (step S504). Specifically, the attribute data generation unit 108 generates attribute data of the content related to the identification data generated by the identification data generation unit 106.

Next, the information processing device 100-2 generates structured data (step S506). Specifically, the structured data generation unit 112 associates the generated identification data with the attribute data and generates structured data.

Then, the information processing device 100-2 transmits the generated structured data (step S508). Specifically, the communication unit 120 transmits the generated structured data to the server 200.

Next, the server 200 stores the received structured data (step S510). Specifically, the storage unit 204 stores the structured data received through the communication unit 202 from the information processing device 100-2.

Then, the server 200 generates a link based on the stored structured data (step S512). Specifically, the link generation unit 206 generates a link between identification data based on the structured data stored in the storage unit 204.

Next, the server 200 stores the generated link (step S514). Specifically, the link generation unit 206 stores the generated link in the storage unit 204.

(Identification Data Retrieval Process)

Figure 10:
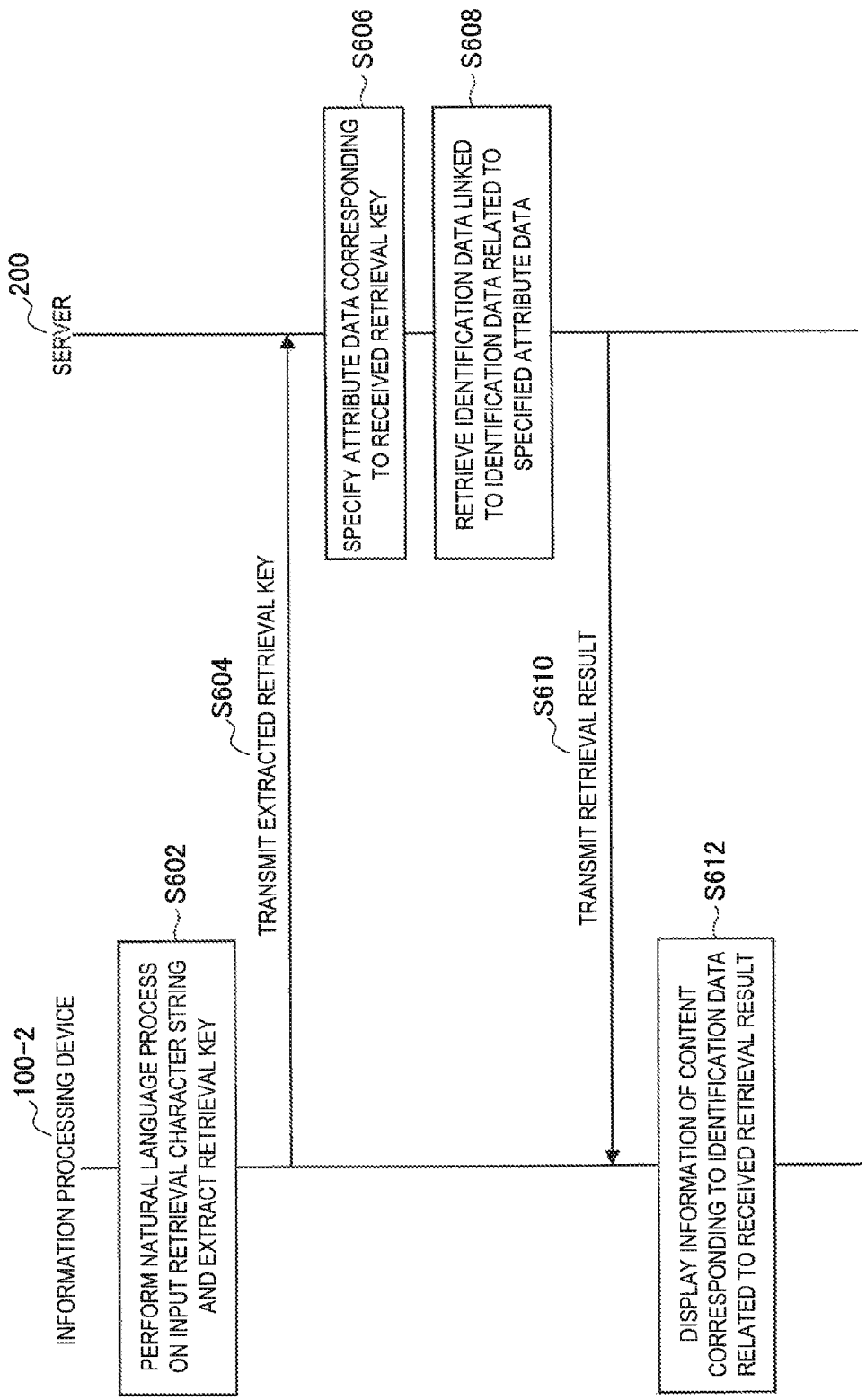
FIG. 10 is a sequence diagram schematically illustrating an identification data retrieval process performed by the information processing system according to the present embodiment.

Subsequently, referring now to FIG. 10, an identification data retrieval process is described. FIG. 10 is a sequence diagram schematically illustrating the identification data retrieval process performed by the information processing system according to the present embodiment.

The information processing device 100-2 performs a natural language process on an input retrieval character string and extracts a retrieval key (step S602). Specifically, the input unit 114 detects a retrieval character string inputted by the user, and the natural language processing unit 110 performs a language process on the detected retrieval character string to extract a retrieval key.

Then, the information processing device 100-2 transmits the extracted retrieval key (step S604). Specifically, the communication unit 120 transmits the retrieval key extracted by the natural language processing unit 110 to the server 200.

Next, the server 200 specifies attribute date corresponding to the received retrieval key (step S606). Specifically, the retrieval unit 208 refers to the structured data stored in the storage unit 204 and specifies attribute data corresponding to the retrieval key received by the communication unit 202.

Then, the server 200 retrieves identification data that is linked to the identification data related to the specified attribute data (step S608). Specifically; the retrieval unit 208 refers to a link between identification data stored in the storage unit 204 and retrieves identification data that is linked to the identification data related to the specified attribute data.

Next, the server 200 transmits a retrieval result (step S610). Specifically, the communication unit 202 transmits a list of identification data retrieved by the retrieval unit 208 to the information processing device 100-2.

Then, the information processing device 100-2 displays information of the content corresponding to the identification data related to the received retrieval result (step S612). Specifically, the display unit 118 displays information of the content corresponding to each of the identification data that is a list of the retrieved identification data received by the communication unit 120.

In this way, according to the second embodiment of the present disclosure, the information processing device 100-2 generates structured data, and the server 200 retrieves identification data based on the generated structured data. Accordingly, it is possible to reduce processing load on the information processing device 100-2 and to increase the speed of retrieval processing, as compared with the first embodiment. In addition, the server 200 holds not the content itself but structured data, and thus it is possible to prevent a leak of the user's personal information due to information leakage and other vulnerabilities in the server 200.

[3-3. Modification]

The second embodiment of the present disclosure has been described. The present embodiment is not limited to the above examples. Modifications of the present embodiment will be described.

As a modification of the present embodiment, there are multiple information processing devices 100-2. If content corresponding to identification data related to the received retrieval result is not stored in the storage unit 104, then each of the information processing devices 100-2 may present information indicative of another information processing device 100-2 that generates identification data related to the retrieval result to the user.

For example, when the information processing device 100-2A receives the retrieval result from the server 200, the display unit 118A (hereinafter, a functional component included in the information processing device 100-2A is denoted by "A" at the end of the reference numeral thereof) of the information processing device 100-2A determines whether the content corresponding to identification data related to the retrieval result is stored in the storage unit 104A. The display unit 118A acquires information, which is contained in the identification data corresponding to the content that is not determined to be stored in the storage unit 104A and indicates an information processing device that generates identification data, for example, an information processing device 100-2B, from the identification data, and displays the acquired information. The display unit 118A acquires information of the content corresponding to the identification data determined that the corresponding content is stored in the storage unit 104A, from the storage unit 104A, and displays the acquired information of the content.

In this way, according to the modification of the present embodiment, when the content corresponding to the identification data related to the received retrieval result is not stored in the storage unit 104, each of the information processing devices 100-2 presents information indicating information processing device 100-2 that generates the identification data to the user. Thus, the user can more easily recognize the information processing device 100-2 having the content desired by the user.

4. HARDWARE CONFIGURATION OF INFORMATION PROCESSING DEVICE ACCORDING TO EMBODIMENT OF PRESENT DISCLOSURE

The embodiments of the present disclosure have been described. The processing in the information processing device 100 is implemented by cooperation of software and hardware structure of the information processing device 100 described below.

FIG. 11 is a diagram illustrated to describe the hardware configuration of the information processing device 100 according to an embodiment of the present disclosure. As illustrated in FIG. 11, the information processing device 100 is configured to include a central processing unit (CPU) 132, a read-only memory (ROM) 134, a random-access memory (RAM) 136, a bridge 138, a bus 140, an interface 142, an input unit 144, an output unit 146, a storage unit 148, a drive 150, a connection port 152, and a communication unit 154.

The CPU 132 functions as an arithmetic processing unit and a control unit, and implements the application 102, the identification data generation unit 106, the attribute data generation unit 108, the natural language processing unit 110, the structured data generation unit 112, and the retrieval unit 116, using various types of programs. The CPU 132 may be a microprocessor. The ROM 134 stores a program, a calculation parameter, and the like used by the CPU 132. The RAM 136 temporarily stores programs used when the CPU 132 is executed, and various parameters that change as appropriate when executing such programs. The ROM 134 and the RAM 136 implement a part of the storage unit 104 in the information processing device 100. The CPU 132, the ROM 134, and the RAM 136 are connected to each other via an internal bus including a CPU bus and other buses.

The input unit 144 includes as an example of the input unit 114 of the information processing device 100: an input mechanism used by the user for imputing information, such as a mouse, a keyboard, a touch screen, a button, a microphone, a switch, or a lever; an input control circuit configured to generate an input signal based on user input and to output the signal to the CPU 132; and the like. By operating the input unit 144, the user of the information processing device 100 can input various data into the information processing device 100 and instruct the information processing device 100 to perform a processing operation.

As an example of the display unit 118 of the information processing device 100, the output unit 146 performs output to a liquid crystal display (LCD) device, an organic light emitting diode (OLED) device, or a lamp. Further, the output unit 146 may perform sound output to a speaker or headphones.

The storage unit 148 is a unit for data storage. The storage unit 148 may include a storage medium, a recording device which records data in a storage medium, a reader device which reads data from a storage medium, a deletion device which deletes data recorded in a storage medium, and the like. The storage unit 148 stores therein the programs executed by the CPU 132 and various data.

The drive 150 is a reader/writer for a recording medium, and is incorporated in or externally attached to the information processing device 100. The drive 150 reads information recorded on a removable recording medium that is mounted such as a magnetic disk, an optical disc, a magneto-optical disk, or semiconductor memory; and outputs the information to the RAM 134. The drive 150 also writes information to the removable recording medium.

The connection port 152 is a bus for connecting with peripheral equipment or an information processing device external to the information processing device 100, for example. The connection port may 152 may be a universal serial bus (USB).

The communication unit 154 is, as an example of the communication unit 120 of the information processing device 100, for example, a communication interface including a communication device for connection to a network. Further, the communication unit 154 may be a device corresponding to infrared communication, a communication device corresponding to a wireless local area network (LAN), a communication device corresponding to long term evolution (LTE), or a wire communication device that performs wired communication.

5. CONCLUSION

According to the first embodiment of the present disclosure, it is possible to present information relevant to the user's desired information to the user. According to the second embodiment of the present disclosure, it is possible to reduce processing load on the information processing device 100-2 and to increase the speed of retrieval processing, as compared with the first embodiment. In addition, the server 200 holds not the content itself but structured data, and thus it is possible to prevent a leak of the user's personal information due to information leakage and other vulnerabilities in the server 200.

It should be understood by those skilled in the art that various modifications, combinations, sub-combinations and alterations may occur depending on design requirements and other factors insofar as they are within the scope of the appended claims or the equivalents thereof.

For example, in the second modification of the first embodiment and the second embodiment, there has been described an example in which the link generation unit generates a link between identification data, but the present disclosure is not limited thereto. For example, the link generation unit may generate a link between identification data and content capable of being acquired through a network. For example, the link generation unit may specify content on the Internet related to attribute data associated with the identification data and may generate a link between the identification data. The link generation unit may generate information that indicates a uniform resource locator (URL) of the specified content on the Internet. In this case, content other than the content included in the information processing device 100 can be presented as a retrieval result, and thus it is possible to provide more relevant retrieval results for the user.

Note that the present disclosure is not limited to the effect stated above and in addition to or in place of the effect stated above, may achieve any of the effects indicated in this specification or effects that can be understood from the specification.

What is claimed is:
1. An information processing device comprising:
 an extraction unit configured to extract data of each of a plurality of pieces of content as attribute data;
 a storage unit configured to store identification data and the attribute data, the identification data comprising an identifier and location information of each of the plurality of pieces of content, and associated with the attribute data;
a retrieval unit configured to
specify attribute data corresponding to a retrieval key,
perform retrieval of identification data related to the specified attribute data, and
perform retrieval of identification data related to another attribute data associated with the identification data related to the specified attribute data,
wherein the another attribute data comprises an inclusion relation with the specified attribute data, and
wherein the extraction unit, the storage unit, and the retrieval unit are each implemented via at least one processor.

2. The information processing device according to claim 1, wherein the retrieval unit performs retrieval when a number of pieces of the identification data related to the another attribute data is equal to or smaller than a predetermined number.

3. The information processing device according to claim 2, wherein the predetermined number is set by a user.

4. The information processing device according to claim 2, wherein the retrieval unit determines whether there is a relationship between the attribute data and the identification data, based on a inclusion relation between the attribute data and the another attribute data associated with the identification data.

5. The information processing device according to claim 1, wherein the extraction unit is further configured to extract the retrieval key from input data using a natural language process,
wherein the retrieval unit performs retrieval using the retrieval key extracted by the extraction unit.

6. The information processing device according to claim 1, further comprising:
a structured data generation unit configured to generate the identification data and the attribute data of each of the plurality of pieces of content,
wherein the storage unit stores the identification data and the attribute data generated by the structured data generation unit, and
wherein the structured data generation unit is implemented via at least one processor.

7. The information processing device according to claim 1, further comprising:
a link generation unit configured to generate a link between the identification data and the another identification data related to the attribute data associated with the identification data,
wherein the retrieval unit performs retrieval using a link generated by the link generation unit, and
wherein the link generation unit is implemented via at least one processor.

8. The information processing device according to claim 6,
wherein the structured data generation unit generates the identification data and the attribute data of each of the plurality of pieces of content contained in a plurality of applications, and
wherein the retrieval unit performs processing on the identification data and the attribute data generated by the structured data generation unit.

9. The information processing device according to claim 1, further comprising:
a display controller configured to cause information of content corresponding to the identification data related to the specified attribute data and the identification data related to the another attribute data retrieved by the retrieval unit to be displayed,
wherein the display controller causes information of content corresponding to some identification data from among retrieved identification data to be displayed, and
wherein the display controller is implemented via at least one processor.

10. The information processing device according to claim 9, wherein the display controller causes information of content corresponding to identification data specified based on a category to which identification data belongs to be displayed.

11. An information processing system comprising:
an information processing device including
a storage unit configured to store a plurality pieces of content,
a structured data generation unit configured to generate identification data and attribute data of each of the plurality of pieces of content stored in the storage unit, the identification data comprising an identifier and location information of each of the plurality of pieces of content, and associated with the attribute data, and
a communication unit configured to transmit the identification data and the attribute data of content generated by the structured data generation unit and transmit a retrieval key,
wherein the storage unit, the structured data generation unit, and the communication unit are each implemented via at least one processor, and
a server including
a communication unit configured to receive the identification data and the attribute data of each of the plurality pieces of content and receive the retrieval key,
a storage unit configured to store the identification data and the attribute data of each of the plurality pieces of content that has been received, and
a retrieval unit configured to
specify attribute data corresponding to the retrieval key that has been received,
perform retrieval of identification data related to the specified attribute data, and
perform retrieval of identification data related to another attribute data associated with the identification data related to attribute data that has been specified,
wherein the another attribute data comprises an inclusion relation with the specified attribute data,
wherein the communication unit of the server transmits a result obtained by retrieval to the information processing device, and
wherein the communication unit, the storage unit, and the retrieval unit are each implemented via at least one processor.

12. The information processing system according to claim 11,
wherein the server further includes a link generation unit configured to generate a link between the identification data and the another identification data related to the attribute data associated with the identification data,
wherein the retrieval unit performs retrieval using a link generated by the link generation unit, and
wherein the link generation unit is implemented via at least one processor.

13. The information processing system according to claim 11,
> wherein the information processing system includes a plurality of the information processing devices,
> wherein the identification data contains information indicative of an information processing device that generates the identification data, and
> wherein the information processing device, when no content corresponding to identification data related to a received retrieval result is stored in the storage unit, presents information indicative of an information processing device that generates identification data related to the retrieval result to a user.

14. An information processing method executed using at least one processor, the method comprising:
> extracting data of each of a plurality of pieces of content as attribute data;
> storing identification data and the attribute data, the identification data comprising an identifier and location information of each of the plurality of pieces of content, and associated with the attribute data;
> specifying attribute data corresponding to a retrieval key,
> performing retrieval of identification data related to the specified attribute data; and
> performing retrieval of identification data related to another attribute data associated with the identification data related to the specified attribute data,
> wherein the specified attribute data comprises an inclusion relation with the another attribute data.

15. A non-transitory computer-readable medium having embodied thereon a program, which when executed by a computer causes the computer to execute a method, the method comprising:
> extracting data of each of a plurality of pieces of content as attribute data;
> storing identification data and the attribute data, the identification data comprising an identifier and location information of each of the plurality of pieces of content, and associated with the attribute data;
> specifying attribute data corresponding to a retrieval key,
> performing retrieval of identification data related to the specified attribute data; and
> performing retrieval of identification data related to another attribute data associated with the identification data related to the specified attribute data,
> wherein the another attribute data comprises an inclusion relation with the specified attribute data.

16. The information processing device according to claim 1, wherein the retrieval unit does not perform retrieval of the identification data related to the another attribute data when a number of pieces of the identification data related to the another attribute data is more than a predetermined number.

17. The information processing device according to claim 1, wherein the identification data related to the specified attribute data is different from the identification data related to the another attribute data, and the identification data related to the specified attribute data and the identification data related to the another attribute data are associated with a same attribute data.

* * * * *